United States Patent
Riewe et al.

(10) Patent No.: US 6,826,478 B2
(45) Date of Patent: Nov. 30, 2004

(54) INERTIAL NAVIGATION SYSTEM FOR MOBILE OBJECTS WITH CONSTRAINTS

(75) Inventors: Frederick Eugene Riewe, Satellite Beach, FL (US); Harry T. Gaines, Seminole, FL (US)

(73) Assignee: ENSCO, Inc., Falls Church, VA (US)

( * ) Notice: Subject to any disclaimer, the term of this patent is extended or adjusted under 35 U.S.C. 154(b) by 0 days.

(21) Appl. No.: 10/411,369

(22) Filed: Apr. 11, 2003

(65) Prior Publication Data

US 2003/0216865 A1 Nov. 20, 2003

Related U.S. Application Data

(60) Provisional application No. 60/371,733, filed on Apr. 12, 2002.

(51) Int. Cl.$^7$ .............................................. G01C 21/26
(52) U.S. Cl. ...................... 701/220; 701/214; 701/210; 340/988; 340/995.25
(58) Field of Search ................................ 701/220, 200, 701/210, 213, 214; 73/178 R; 340/988, 995.25

(56) References Cited

U.S. PATENT DOCUMENTS

| | | | | |
|---|---|---|---|---|
| 5,311,173 A | * | 5/1994 | Komura et al. ........ | 340/995.22 |
| 5,610,815 A | | 3/1997 | Gudat et al. | |
| 5,629,855 A | * | 5/1997 | Kyrtsos et al. ............. | 701/300 |
| 5,828,987 A | * | 10/1998 | Tano et al. ................. | 702/150 |
| 5,902,351 A | * | 5/1999 | Streit et al. ................. | 701/220 |
| 5,928,309 A | | 7/1999 | Korver et al. | |
| 6,012,013 A | | 1/2000 | McBurney | |
| 6,014,608 A | * | 1/2000 | Seo ............................ | 701/207 |
| 6,018,698 A | | 1/2000 | Nicosia et al. | |
| 6,041,280 A | | 3/2000 | Kohli et al. | |
| 6,081,230 A | | 6/2000 | Hoshino et al. | |
| 6,134,484 A | | 10/2000 | Geier et al. | |
| 6,205,400 B1 | | 3/2001 | Lin | |
| 6,208,936 B1 | | 3/2001 | Minor et al. | |
| 6,253,154 B1 | * | 6/2001 | Oshizawa et al. .......... | 701/221 |
| 6,445,983 B1 | * | 9/2002 | Dickson et al. ............... | 701/23 |

* cited by examiner

*Primary Examiner*—Thomas G. Black
*Assistant Examiner*—Olga Hernandez
(74) *Attorney, Agent, or Firm*—Nixon Peabody LLP; Jeffrey L. Costellia

(57) ABSTRACT

An aided inertial navigation system and method for navigating a mobile object having constraints comprising an inertial measurement unit, a processor, and an error correction device. The inertial measurement unit provides acceleration data and/or angular velocity data of the mobile object. The processor is adapted to receive the acceleration data and/or angular velocity data, and to provide output data with position output indicative of position of the mobile object. The error correction device receives as input, state and dynamics information and auxiliary input data including map information associated with the path, speed data, wheel-angle data and discrete data. The error correction device provides as output, state corrections to the processor that enhance accuracy of the position output. The state corrections are used by the processor to estimate position of the mobile object based on the constraints to the mobile object and the map information associated with the path.

39 Claims, 5 Drawing Sheets

Confidence interval along track

Confidence radius

Confidence ellipse

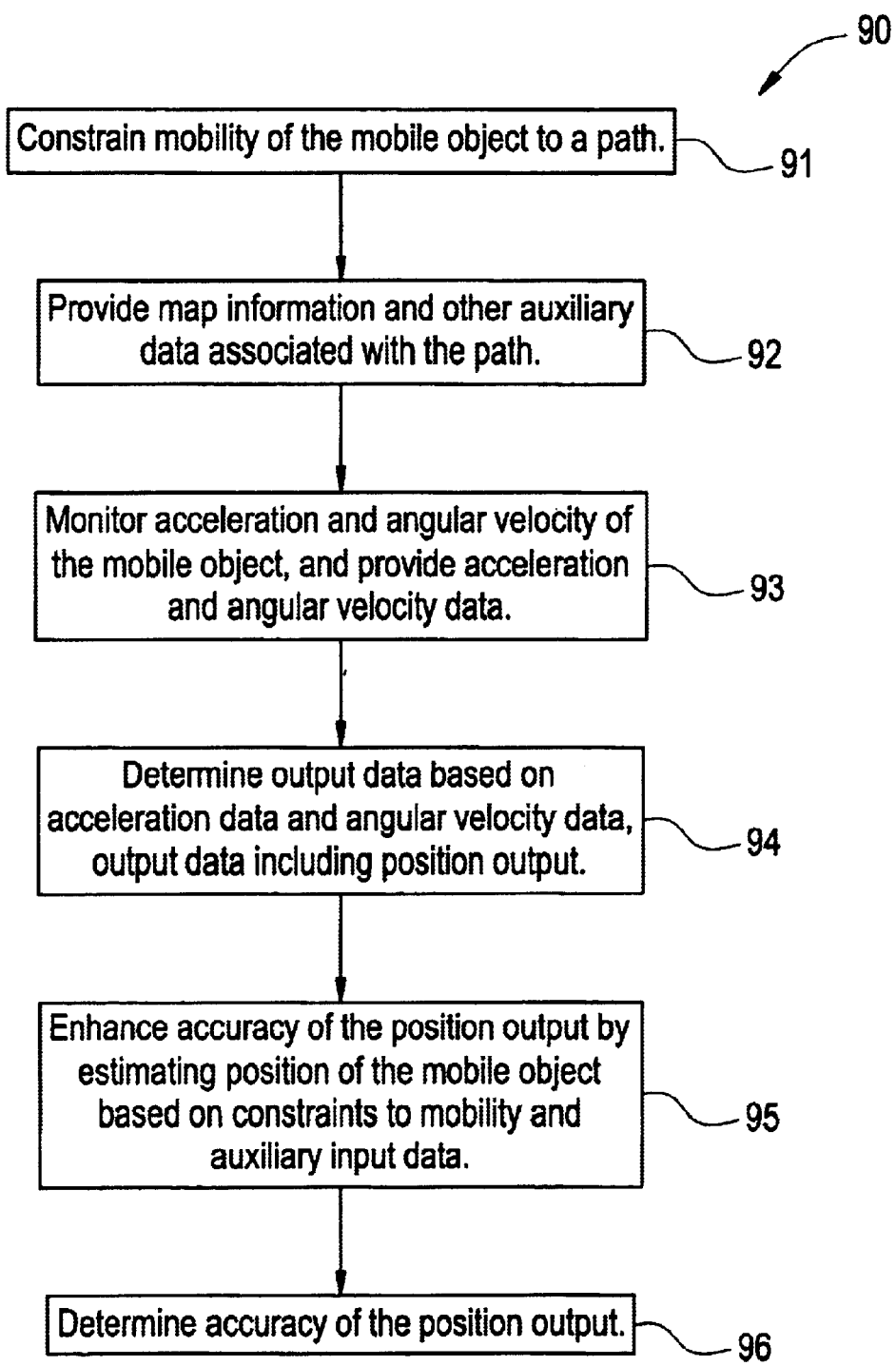

INERTIAL NAVIGATION SYSTEM FOR MOBILE OBJECTS WITH CONSTRAINTS

This application claims priority to U.S. Provisional Application No. 60/371,733 filed Apr. 12, 2002.

BACKGROUND OF THE INVENTION

1. Field of the Invention

The present invention is directed to an inertial navigation system for mobile objects such as vehicles and the like. In particular, the present invention is directed to such an inertial navigation system for mobile objects having constraints.

2. Description of Related Art

There is an increasing need for smaller and more accurate Inertial Navigation Systems (hereinafter "INS") for navigation of mobile objects. Such INS applications include vehicle navigation, and positioning, guidance, or navigation of objects such as mobile probes and the like. In vehicle navigation applications, such INSs may be used for navigation of automobiles, railcars including locomotives, etc. The implementation of INSs in many applications is facilitated by the availability of Global Positioning System (hereinafter "GPS") receivers or other positioning systems.

For instance, U.S. Pat. No. 6,081,230 to Hoshino et al. (hereinafter "Hoshino et al.") discloses a navigation system that can enhance the position determining accuracy of a mobile object without utilizing high precision measuring instruments. The disclosed navigation system of Hoshino et al. includes a GPS range measuring device, an angular velocity measuring device, a velocity measuring device and an azimuth measuring device, which are used to measure the motion of the mobile object. The navigation system disclosed also includes a GPS range error estimating device, an angular velocity error estimating device, a velocity error estimating device, and an azimuth error estimating device, all of which are used to estimate errors associated with the corresponding measuring devices.

In accordance with Hoshino et al., a position calculating device calculates the position of the mobile object based on the outputs of the error estimating devices. The error estimating devices are implemented using Kalman filters and averaging processes, the factors of the errors of the individual measuring devices being assumed. The outputs of the various measuring devices are thereby corrected so that the position of the mobile object can always be determined at a relatively high level of accuracy without employing a high precision sensor. However, due to the limitations and imprecise nature of the devices, the accuracy of inertial navigational systems such as those described in Hoshino et al. is limited, especially in those instances where GPS position data is not readily available, for example, when the GPS signal to the inertial navigational system is obstructed.

In addition, although the cost of INSs has been decreasing due to various inventions such as the ring laser gyro and the fiber optic gyro, commercial INSs still cost tens of thousands of dollars. Recent technology advances have produced sensors that are smaller and less expensive which can be readily implemented in INSs. One such development is the introduction of MicroElectroMechanical Systems (hereinafter "MEMS"), which are miniature mechanical devices that are manufactured using techniques similar to those used in the production of integrated circuits. However, at their present stage of development, MEMS are less accurate than other more costly inertial sensors for use in INSs.

Therefore, there still exists an unfulfilled need for INSs that avoids the limitations of the prior art systems. In particular, there still exists an unfulfilled need for low cost INSs that provides accuracy at levels similar to that of currently available, expensive, commercial INSs. In addition, there still exists an unfulfilled need for such INSs that can provide accurate navigational information even when GPS position data is occasionally or intermittently unavailable.

SUMMARY OF THE INVENTION

In view of the forgoing, one advantage of the present invention is in providing an Aided Inertial Navigation System (hereinafter "AINS") that improves the accuracy of navigation for any type of inertial sensors.

Another advantage of the present invention is in providing such an AINS that is more affordable than presently available commercial INSs while providing similar levels of accuracy.

Yet another advantage of the present invention is in providing such an AINS that can provide accurate navigational information even when GPS position data is occasionally or intermittently unavailable.

A significant advantage of one embodiment of the present invention is that it allows use of various types of inertial sensors, including MEMS sensors. Although individual MEMS or other types of sensors may not have the accuracy needed for use in high-precision commercial INSs, the accuracy is increased by the AINSs in accordance with the present invention by aiding the AINSs with auxiliary input data from additional sources, and by making use of information from the known constraints on a mobile object's motion, if such constraints exist. Thus, by allowing the use of various, cost effective types of inertial sensors, such as MEMS, the AINS in accordance with the present invention can be implemented economically.

These and other advantages are attained by an aided inertial navigation system (AINS) in accordance with one embodiment of the present invention for navigating a mobile object having constraints which constrain mobility of the mobile object to a path. The AINS comprises an inertial measurement unit, a processor, and an error correction device. The inertial measurement unit is adapted to provide acceleration data and angular velocity data of the mobile object, the mobile object having constraints which constrain mobility of the mobile object to a path. The processor is adapted to receive the acceleration data and angular velocity data from the inertial measurement unit, and to provide output data with position output indicative of position of the mobile object. The error correction device is adapted to receive as input, state and dynamics information of the mobile object, and provide as output, state corrections to the processor. In accordance with one embodiment of the present invention, the processor enhances the position output based on the state corrections and the constraints to the mobile object to increase accuracy of the position output.

In one embodiment, the inertial measurement unit may include an accelerometer that provides the acceleration data, and/or a gyroscope that provides the angular velocity data. The processor may be an inertial navigation and sensor compensation unit. The output data may further include a velocity output indicative of speed of the mobile object, and an attitude output indicative of direction of movement of the mobile object. Moreover, the output data may also include an accuracy output indicative of accuracy of the position output which may be expressed as a confidence interval for distance along the path, a confidence circle, and/or a confidence ellipse.

In accordance with another embodiment, the error correction device is further adapted to receive auxiliary input data including positional input data, map information associated with the path, speed data, wheel-angle data, and/or discrete data. The state corrections provided to the processor may then be based on the auxiliary input data as well as the state and dynamics information. In this regard, the error correction device may be implemented as a Kalman filter that is further adapted to receive the auxiliary input data. The positional input data may be provided by a Global Positioning System, a Differential GPS, an ultrasonic positioning system, and/or a radio-frequency positioning system. The speed data may be provided by an odometer, a wheel tachometer, and/or a Doppler radar. The wheel angle data may be provided by a wheel angle sensor and/or a truck angle sensor. The discrete data may be provided by a transponder and a rail detector. In such an embodiment, the Kalman filter may be provided with zero-azimuth-change observations when the mobile object is stationary. The map information may include coordinates of a series of map points marking at least one map segment and/or include along-path distances between the series of map points. The processor may be further adapted to calculate a maximum distance error between a segment of the path and the map segment.

The AINS in accordance with the present invention may be readily applied to mobile objects that are constrained to move along a path. For example, the mobile object may be an automobile where the path is defined by a road, a railcar or a trolley where the path is defined by a track, or a mobile probe where the path is defined by a pipe.

In accordance with another embodiment of the present invention, the AINS includes an inertial measurement unit adapted to provide acceleration data and/or angular velocity data of the mobile object, a processor adapted to receive the acceleration data and/or angular velocity data from the inertial measurement unit, and to provide output data with position output indicative of position of the mobile object, and a Kalman filter adapted to receive as input, state and dynamics information of the mobile object, and provide as output, state corrections to the processor, the Kalman filter being provided with zero-azimuth-change observations when the mobile object is stationary, where the processor enhances the position output based on the state corrections to increase accuracy of the position output.

In accordance with another aspect of the present invention, a method for navigating a mobile object is provided comprising the steps of constraining mobility of the mobile object to a path, monitoring acceleration and angular velocity of the mobile object, providing acceleration data and angular velocity data, determining output data with position output indicative of position of the mobile object based on the acceleration data and angular velocity data, and enhancing accuracy of the position output indicative of position of the mobile object based on the constraints to mobility of the mobile object.

The method of the present invention may include the step of providing map information associated with the path, wherein the step of enhancing accuracy of the position output is also based on the map information. In addition, or in the alternative, the step of enhancing accuracy of the position output may be based on state and dynamics information of the mobile object, the state and dynamics information being derived from the acceleration data and angular velocity data.

The method may further include the steps of determining velocity and attitude of the mobile object, and providing a velocity output indicative of speed of the mobile object and an attitude output indicative of direction of the mobile object. The method may also include the step of determining accuracy of the position output, the output data further including an accuracy output indicative of accuracy of the position output.

The step of enhancing accuracy of the position output may also include the step of generating state corrections using a Kalman filter based on positional input data, speed data, map information, wheel angle data, and discrete data. In this regard, the method may further include the step of determining smoothly varying distance along path for use as the speed data. The map information preferably includes coordinates of a series of map points marking at least one map segment, and along-path distances between the series of points. The method may also include the steps of determining where position of the mobile object coincides with a known map point, and further enhancing accuracy of the position output based on the known map point. In addition, or alternatively, the method may include the steps of monitoring along path distance, and comparing the along path distance to length of the map segment to determine accuracy of the map information. In addition, a maximum distance error between a segment of the path and the map segment may be calculated. When a Kalman filter is used, the Kalman filter may be provided with zero-azimuth-change observations when the mobile object is stationary.

In accordance with another aspect of the present invention, a method for navigating a mobile object is provided comprising the steps of monitoring acceleration and angular velocity of the mobile object, providing acceleration data and angular velocity data, determining output data with position output indicative of position of the mobile object for navigating the mobile object based on the acceleration data and angular velocity data, providing a Kalman filter adapted to receive state and dynamics information of the mobile object as input, and providing state corrections as outputs, and providing the Kalman filter with zero-azimuth-change observations when the mobile object is stationary to enhance accuracy of the position output indicative of position of the mobile object.

In another embodiment, the method may also include the steps of determining whether the mobile object is stationary, and establishing an azimuth reference value by sampling and saving a current azimuth value. In this regard, the method may also include the steps of establishing an azimuth reference error in the Kalman filter error state which is same as the azimuth reference value, and adjusting an error state covariance matrix to accurately reflect the azimuth reference error.

The above noted advantages and features of the present invention will become more apparent from the following detailed description of the preferred embodiments of the present invention when viewed in conjunction with the accompanying drawing.

BRIEF DESCRIPTION OF THE DRAWING

FIG. 8 is a flow diagram of a method for navigating a mobile object in accordance with another aspect of the present invention.

DETAILED DESCRIPTION OF THE INVENTION

The basic architecture for the aided inertial navigation system 10 (hereinafter "AINS") in accordance with one embodiment of the present invention is illustrated in the schematic block diagram of FIG. 1. As will be evident by the description and operation of the AINS in accordance with one embodiment of the present invention, the present invention may advantageously be used in applications where the mobile object is a vehicle. Moreover, further advantages can be attained where the vehicle is constrained to follow a path such as a road or a track, etc. such as an automobile or a railcar. It should be understood, however, that the AINS of the present invention can be used for any mobile object such as other types of vehicles or any other devices in which navigational information would be valuable. For example, the AINS of the present invention may be used for mobile objects such as probes that may be used to navigate through pipes, tubes, conduits, other pathways, or the like.

Of course, the AINS in accordance with the present invention may be used for navigation of the mobile object in any type of motion, whether or not it is constrained to a path, such as a road or tracks. However, as will also be evident from the discussion below, the AINS in accordance with the present invention utilizes auxiliary information such as map information, speed data, wheel-angle data, and discrete data to enhance the accuracy of the navigational information so that AINS provides a similar level of accuracy as presently available from commercial INSs, while avoiding the use of expensive, high precision measuring instruments.

Figure 1:
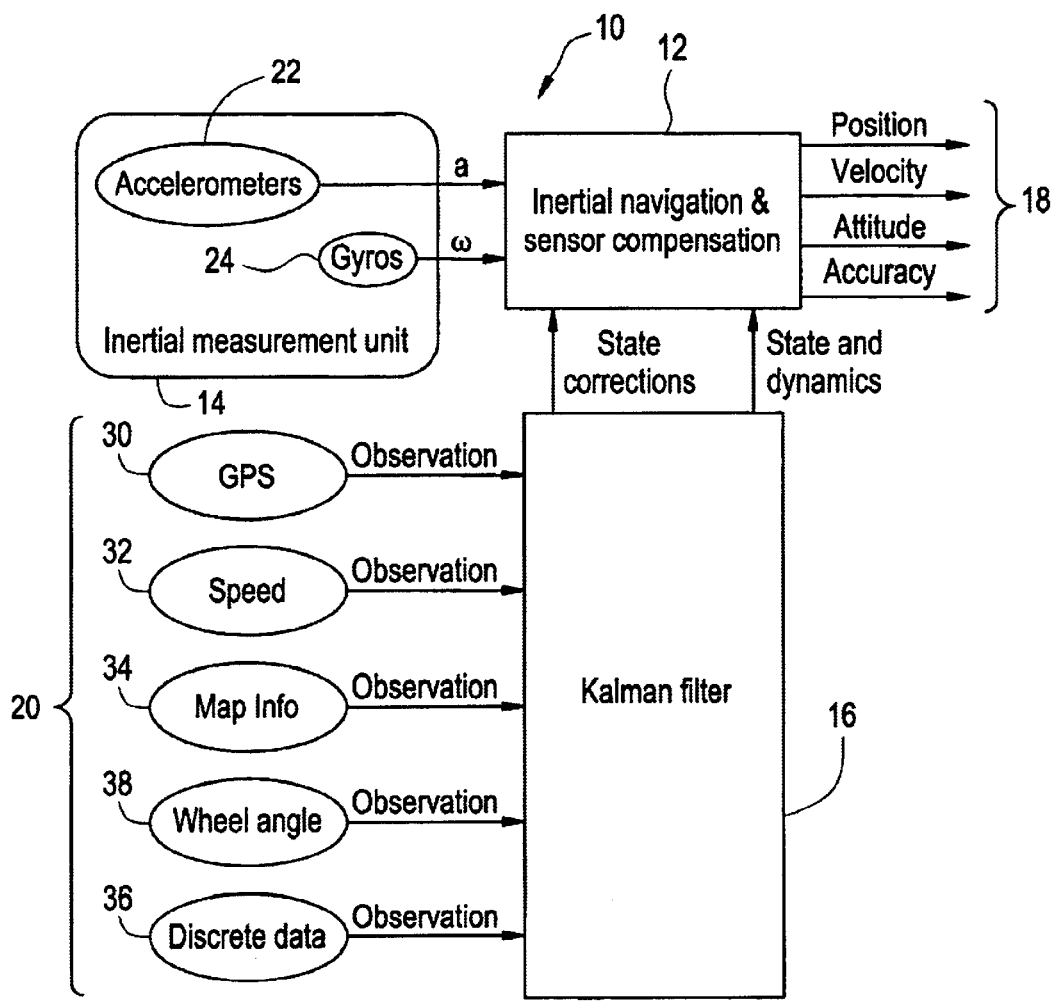
FIG. 1 is a schematic view of an aided inertial navigation system in accordance with one embodiment of the present invention.

Referring to FIG. 1, the AINS 10 in the illustrated embodiment includes a processor such as an inertial navigational and sensor compensation unit 12, the function of which is described in further detail below. The AINS 10 shown also includes an inertial measurement unit 14 for providing data to the processor of AINS 10, i.e. the inertial navigation and sensor compensation unit 12. Furthermore, the AINS 10 also includes an error estimating device such as a Kalman filter 16 that combines auxiliary input data 20 provided thereto, the Kalman filter 16 also obtaining as input data, the state and dynamics information from the inertial navigation and sensor compensation unit 12. The Kalman filter 16 provides the inertial navigation and sensor compensation unit 12 with state corrections based on state and dynamics of the vehicle, as well as the auxiliary input data 20, each of which is described in further detail below.

It should be noted that although certain components of AINS 10 of the present embodiment are illustrated as combined units in FIG. 1 whereas other components are illustrated as separate components, it should be understood that FIG. 1 illustrates merely one example of the AINS 10, and the present invention should not be construed to be limited thereto. In this regard, in other embodiments, the various components as described herein below may be separated or combined in any appropriate combinations so that the AINS may be configured differently.

As explained in detail below, navigation is improved by the AINS of the present invention by the use of auxiliary input data such as the speed-sensor data which determines the motion along the path, while map information is used to determine the position in the direction perpendicular to the path. Navigation may be further improved by restricting lateral motion and by including additional auxiliary input data, including discrete data inputs, such as transponder data and wheel angle data. In addition to the usual three-dimensional output of a navigation system that typically includes location, velocity and attitude, the AINS in accordance with the present invention also provides one-dimensional information such as distance, speed, as well as accuracy measures such as confidence interval, confidence circle, or confidence ellipse.

In the above regard, inertial measurement unit 14 in the illustrated embodiment of FIG. 1 includes accelerometers 22 and gyroscopes 24 that provide acceleration data and angular velocity data, respectively, as input data to the inertial navigation and sensor compensation unit 12. This input data from the inertial measurement unit 14 is processed by the inertial navigation and sensor compensation unit 12 of AINS 10 to provide various outputs 18. In the present illustrated example of FIG. 1, the outputs 18 include position output that preferably includes distance traveled, velocity output, and attitude output that describes the orientation of the mobile object such as a vehicle. Furthermore, the outputs 18 of the present embodiment include accuracy output that provides an indication of how accurately the AINS 10 is providing the position information. In addition, the inertial navigation and sensor compensation unit 12 also provides state and dynamics information to the Kalman filter 16 as discussed in further detail below. Of course, in other embodiments, different outputs may be determined and provided by the inertial navigation and sensor compensation unit 12.

Various auxiliary input data 20 are provided to the Kalman filter 16 which processes the auxiliary input data 20 to determine and provide state corrections to the inertial navigation and sensor compensation unit 12. These state corrections from the Kalman filter 16 are used by the inertial navigation and sensor compensation unit 12 to enhance the accuracy of the various outputs 18 thereby enhancing the accuracy of the AINS 10. As can be seen, in the illustrated embodiment, the auxiliary input data 20 includes GPS data 30, speed data 32, map information 34, wheel angle data 38, and other discrete data 36 such as from transponders or rail detectors if the AINS 10 is applied to a railcar or other similar applications.

It should be noted that not all of the auxiliary input data 20 shown in FIG. 1 need be provided in other embodiments while additional auxiliary input data may be provided in still other embodiments. For example, wheel angle data 38 and/or discrete data 36 may not be provided in embodiments where sensors for providing such data are not utilized. In another example, the AINS 10 may further be provided with an azimuth sensor for providing actual azimuth data.

Moreover, the AINS 10 in accordance with the present invention is preferably adapted to operate and provide the navigational outputs 18 even if one or more of the auxiliary input data 20 is unavailable. For example, as described in further detail below, the AINS 10 of the illustrated embodiment is preferably adapted to provide the outputs 18 even when GPS data 30 is temporarily unavailable. Such unavailability of GPS data 30 may occur due to obstructions caused by buildings, trees, tunnels, etc. that impede the signals from the GPS satellites to the AINS 10. It should also be noted that, whereas GPS data 30 is specifically shown, other positional input data may also be used, such as data from differential GPS, ultrasonic or radio-frequency positioning systems, or other devices in other embodiments as well.

Furthermore, whereas a Kalman filter 16 is utilized for the error estimating device in the illustrated embodiment of the AINS 10, any appropriate error estimating device or method may be used. For example other digital or analog filtering or maximum likelihood estimation schemes may be used to process the input data 20 and to provide the state corrections to the inertial navigation and sensor compensation unit 12. However, the use of the Kalman filter 16 has been found to be effective in the present invention since it successfully integrates inputs from sensors with differing characteristics.

The AINS 10 in accordance with the present invention utilizes the state corrections from the Kalman filter 16 to provide accurate navigational output 18. The state corrections are determined from the state and dynamics information from the inertial navigation and sensor compensation unit 12, together with various auxiliary input data 20 such as GPS data 30, speed data 32, map information 34, wheel-angle data 38, and/or discrete data 36. As noted, the inertial navigation and sensor compensation unit 12 of the AINS 10 provides various outputs 18 which in the present embodiment, includes position output, velocity output, attitude output, and accuracy output. These outputs 18 readily allow accurate navigation of the mobile object and provide various navigational information including distance traveled and speed, while also providing a confidence level for the determined position or distance.

Figure 2A:
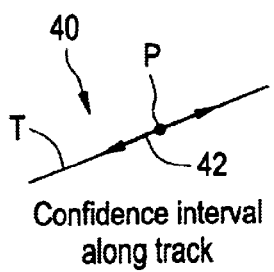
FIG. 2A is an illustration that depicts a confidence value as a confidence interval for the distance along a path.
Figure 2B:
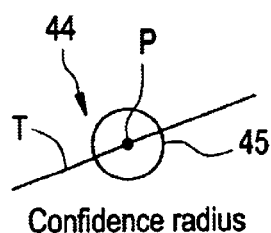
FIG. 2B is an illustration that depicts a confidence value as a confidence circle.
Figure 2C:
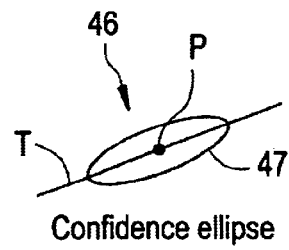
FIG. 2C is an illustration that depicts a confidence value as a confidence ellipse.

The accuracy output that is provided as one of outputs 18 of the AINS 10 may be a confidence value that is expressed as a confidence interval for the distance along the path, a confidence circle, or a confidence ellipse for the position of the mobile object. In other words, the position output may be expressed as being accurate within a certain distance or within a certain radius from the actual position. FIGS. 2A to 2C show schematic illustrations of how the confidence value may be depicted/expressed and interpreted.

FIG. 2A shows an illustration 40 that depicts the accuracy output 18 as confidence interval for the distance along a path. In particular, FIG. 2A schematically shows a mobile object at a determined position "P" along the path or track "T" which indicates the most probable location of the mobile object along track T. The confidence interval 42 along the path or track T is indicated by the bold segment of the track T, the bold segment indicating that the actual position of the mobile object is within a certain distance along the path or track T from the determined position P. Of course, as the confidence interval 42 decreases in length, the distance that the determined position P can deviate from the actual position decreases, and as the confidence interval 42 increases in length, the distance that the determined position P can deviate from the actual position also increases.

FIG. 2B shows an illustration 44 that depicts the confidence value as a confidence circle. In particular, in a similar manner to FIG. 2A, FIG. 2B also shows a mobile object at a determined position P along the path or track T. The confidence circle 45 indicates that the actual position of the mobile object is within the confidence circle 45 from the determined position P. As the confidence circle 45 decreases in size, the distance that the determined position P can deviate from the actual position of the mobile object decreases, and vice versa.

In a similar manner to FIG. 2B discussed above, FIG. 2C shows an illustration 44 that depicts the confidence value as a confidence ellipse. FIG. 2C shows a mobile object at a determined position P along the path or track T, the confidence ellipse 47 indicating that the actual position of the mobile object is within the confidence ellipse 47 from the determined position P. Correspondingly, as the confidence ellipse 47 decreases in size, the distance that the determined position P can deviate from the actual position of the mobile object decreases, and vice versa.

It should be understood that whereas in the illustrations of FIGS. 2A to 2C, the confidence value is graphically depicted as confidence interval, confidence circle, and confidence ellipse to facilitate understanding, the AINS 10 may provide this information numerically, textually, by using other types of graphics, or in any other appropriate manner. For example, the AINS 10 may be provided with a display screen (not shown) for displaying a confidence interval, confidence circle, or confidence ellipse in numeric form (such as in feet) or to merely display interpretive text such as "very accurate", "less accurate" etc. when providing the calculated position of the mobile object.

In the above regard, the Kalman filter 16 of FIG. 1 includes an element in the state for distance along the path. The variance of this element in the Kalman filter's 16 covariance matrix determines the confidence interval for distance along the path. In comparison, the confidence circle and the confidence ellipse for the position of the mobile object may be calculated from the covariance of the horizontal position error described in further detail below. The confidence value may then be provided as accuracy output 18 of FIG. 1 so that the accuracy of the AINS 10 in providing the position information can be determined.

In applications of the present invention in which the mobile object to which the AINS 10 is applied is constrained to a specified path, the AINS 10 may also constrain the lateral velocity based on the data associated with the path, such as map information 34. Hence, some of the enhanced features are particularly appropriate for a vehicle that is constrained to a path, such as a road, a track, etc., or a connected set of such paths. These constraints to the mobility of the mobile object may be readily correlated to the information regarding the path (such as a road or track) on which the mobile object is traveling using the map information 34. For example, the auxiliary input data 20 such as speed 32, may be used to determine the position in the along-path direction, while map information 34 may be used to determine the position information perpendicular to, or across the path. In the manner described above, the outputs 18 readily allow determination of distance traveled and speed while the accuracy output provides an indication of the level of confidence one can have in the determined position.

The AINS 10 in accordance with the illustrated embodiment utilizes speed data 32 as input for Kalman filter 16 to provide estimation of along-path distance and along-path confidence interval in the absence of other position input data, such as GPS data 30. By knowing the mobile object's speed, the along-path distance can be estimated which allows approximation of the mobile object's position since the mobile object is constrained to travel along the path, i.e. road or track. Such speed data 32 may be provided by an odometer, wheel tachometer, Doppler radar, or other appropriate device. When GPS data 30 or other position data is available, the speed data 32 is used in combination therewith to improve the determination of position, along-path distance, speed, and along-path confidence interval. For mobile objects not constrained to a fixed path, estimation is enhanced in the direction of the mobile object's motion.

In addition, as previously noted, map information 34 is used as an input for the Kalman filter 16 to improve the estimation of position in the across-path direction, i.e. the direction perpendicular to the path or direction of motion. This is especially valuable when position data such as GPS data 30 is unavailable. Preferably, in one embodiment, the map information 34 is given as the coordinates of a series of points marking segment boundaries and, optionally, the along-path distance between them. For path segments specified by pairs of adjacent points, the closest segment to the estimated location is determined, and the perpendicular gap distance between the segment and the actual path, also referred to herein as the "maximum distance error", is then calculated. This distance error would ideally be zero if the path segments exactly matched the actual path. This distance error is then used by the Kalman filter 16 as an observation to improve the across-path position.

Furthermore, map information 34 provides data regarding distance along the path to allow determination of how much weight should be given to the across-path observations. If the along-path length does not greatly exceed the straight-line length of the corresponding path segment between pairs of adjacent points, the path segment may be treated as being substantially straight. In such a case, the Kalman filter 16 calculates and corrects for the across-path maximum distance error using other available input data 20, even if the along-path position is not precisely known. The weight given to this across-path observation is determined by how much the along-path segment length exceeds the straight-line length, which is an indication of segment curvature.

Figure 3:
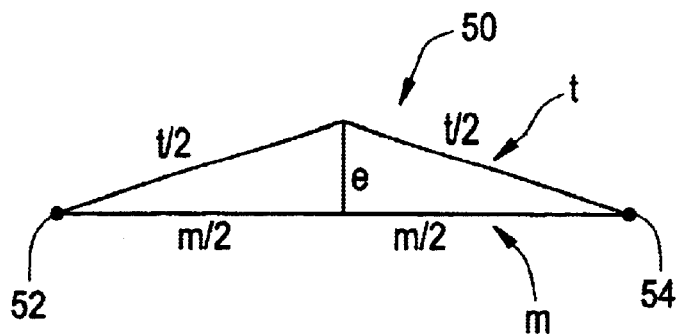
FIG. 3 is a diagram for illustrating a method for estimating the maximum distance error when utilizing map data in accordance with one embodiment of the present invention.

In the above regard, FIG. 3 is a diagram 50 for illustrating a method for calculating the maximum distance error "e" between a track segment of length "t" and a straight-line map segment of length "m" when utilizing map information 34 in accordance with one embodiment of the present invention. As shown, the curvature of the track t is approximated by providing two track segments "t/2". In addition, the map segment is defined between map points 52 and 54. As shown in FIG. 3, the maximum distance error e may be geometrically calculated using the equation:

$$e = \frac{1}{2}\sqrt{t^2 - m^2}.$$

Again, the maximum distance error e indicates the across-path perpendicular gap distance between the straight-line map segment and the actual path.

The speed data 32 also complements the use of map information 34 which improves position estimation perpendicular to the path and/or direction of motion. Hence, if GPS data 30 or other position data is not available, the combined use of speed data 32 and map information 34 allows accurate navigation to continue in accordance with the illustrated embodiment. In this regard, the Kalman filter 16 includes as an element in the state vector, the error of the distance along the path, thus providing for the estimation of distance and allowing determination of accuracy by calculating a confidence value for the determined distance as previously described relative to FIGS. 2A to 2C.

In one embodiment of the present invention, azimuth drift is effectively suppressed when mobile object to which the AINS 10 is applied is not moving, even for extended periods, by providing zero-azimuth-change observations to the Kalman filter 16. This prevents rapid growth of position error that may otherwise ensue when the mobile object resumes motion. It should be noted that zero-velocity observations are also processed by the Kalman filter 16 during periods of no motion so that drift of position, velocity and level attitude are also suppressed. The zero velocity observations alone may suppress azimuth drift in a system employing precision gyros. However, they are ineffective for that purpose in a system employing lower accuracy gyros such as currently available MEMS gyros.

Figure 4:
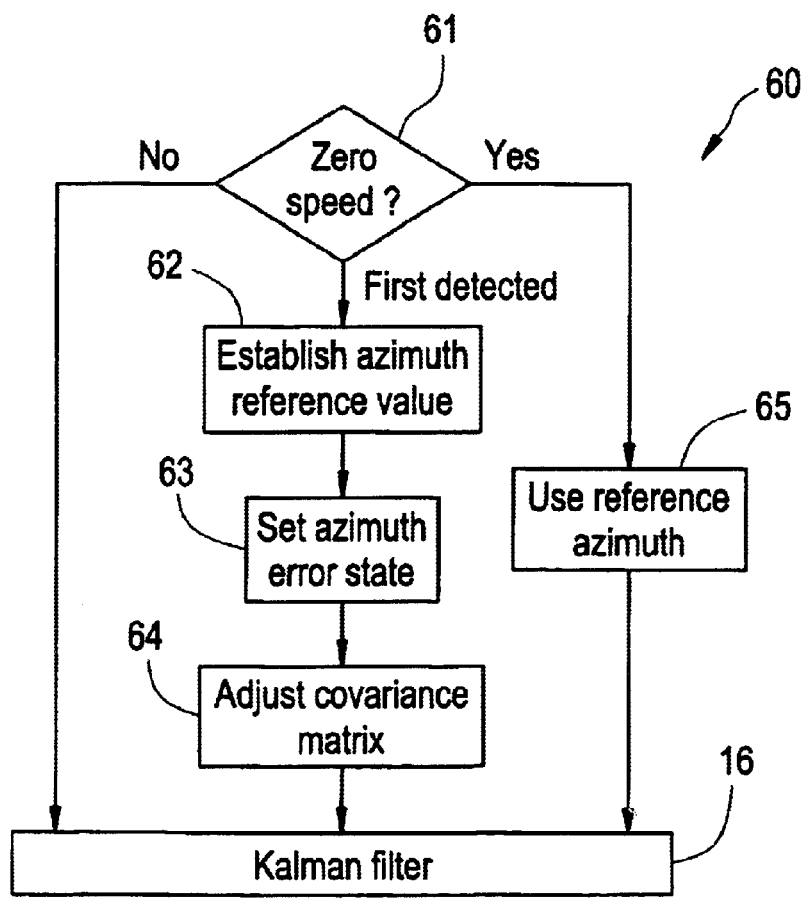
FIG. 4 is a flow diagram illustrating a method of freezing the azimuth of a stationary object by providing zero-azimuth-change observations.

Any method or device can be used to detect the lack of motion of the mobile object to which the AINS 10 is applied. For instance, speed data 32 or a Doppler radar may be used. Of course, other methods or devices could be used as well. In accordance with one implementation, various steps may be taken to support zero-azimuth-change observations when the no-motion condition is detected. For example, FIG. 4 shows a flow diagram 50 illustrating a method of freezing the azimuth of a stationary object by providing zero-azimuth-change observations. Initially, a determination is made in step 61 as to whether the mobile object to which the AINS 10 is applied is stationary, i.e. at zero speed. If the mobile object is not stationary, such information is provided to the Kalman filter 16 and the method of freezing the azimuth is bypassed. If the mobile object is stationary so that speed is zero, and the zero speed is detected as being a first instance, i.e. is new information, an azimuth reference value is established in step 62 by sampling and saving the current azimuth. Then, azimuth reference error is established in the Kalman filter error state with the same value as the azimuth error in step 63. The error state covariance matrix is then adjusted in step 64 to reflect the correct statistics of the azimuth reference error which are then used by the Kalman filter 16. Values in the row and column associated with the azimuth reference error are set so that the azimuth reference error is initially 100% correlated with the azimuth error and these values are not changed by the error state dynamics. These steps ensure proper treatment of the subsequent no-azimuth-change observations, which are simply the difference between the azimuth and the azimuth reference. Thus, if the mobile object is stationary so that speed is zero but is not the first detection thereof, the reference azimuth is provided in step 65 to the Kalman filter 16.

As noted previously, the accuracy of navigation can be improved in the present example embodiment by constraining lateral motion of a mobile object moving along a path since such a mobile object will not have any significant velocity perpendicular or across the path. Because the velocity components perpendicular to the path are zero, these values comprise a two-dimensional observation, which is provided to the Kalman filter 16. To support this observation, two elements are added to the error state vector to describe any misalignment between the inertial measurement unit's 14 coordinate frame, and the coordinate system fixed to the movable object and aligned to its axis of motion. As also previously noted, such an embodiment is especially applicable to vehicles in which mobility is constrained, such as automobiles and railcars.

Figure 5:
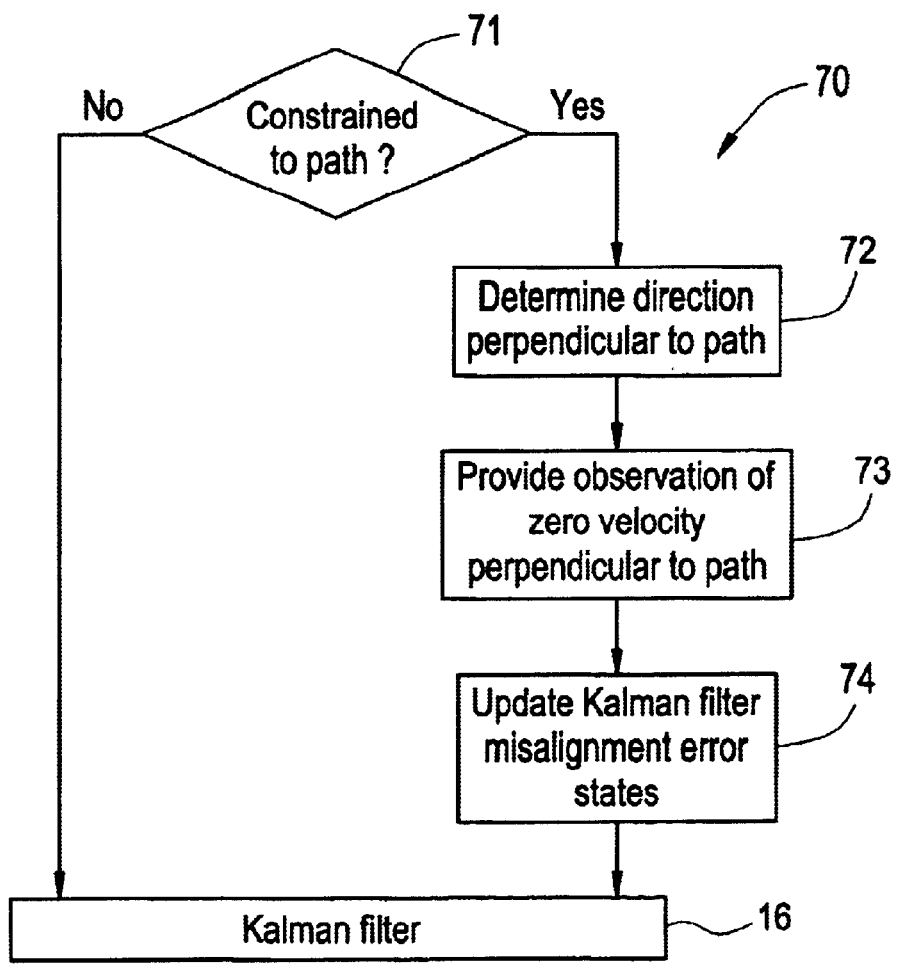
FIG. 5 is a flow diagram illustrating a method for constraining an object to a path by providing observations of zero velocity perpendicular to the path.

In the above regard, FIG. 5 shows a flow diagram 70 illustrating a method for constraining an object to a path in accordance with one embodiment of the present invention.

As shown, a determination is made in step 71 as to whether the mobile object is constrained to a path or not. If the mobile object is not constrained to a path, the process for constraining the object is bypassed and the velocity components are provided to the Kalman filter 16. If the mobile object is constrained to a path, the direction perpendicular to the path is determined in step 72. Observation of zero velocity perpendicular to the path is provided in step 73, and the Kalman filter is updated to describe any misalignment states in step 74 so the outputs 18 provided by the AINS 10 can be improved.

As previously described, the distance along the path between map points provided as part of the map information 34, may be used by the present embodiment of the AINS 10 to determine when the mobile object is near one of the map points. When the distance traveled from the last map point equals the provided map distance between points, it is estimated that the vehicle is at the next map point. This information is then used to improve the position estimation of the vehicle such as when GPS data 30 is unavailable. The position information is provided to the Kalman filter 16 in a similar manner as discrete data 36 shown in FIG. 1. The distance along the path and the map points may also be used to estimate position error along the path. The position error estimate may be based on the error in determining the last accurately known position and the error in distance along the path from that known position. Of course, other methods may be used to estimate position error as well in other embodiments.

In the illustrated embodiment, the AINS 10 also uses the wheel angle data 38 that is provided to the Kalman filter 16 to determine the yaw rate of the mobile object. In an application where the mobile object is a vehicle such as an automobile for example, the wheel angle may be used to determine the instantaneous radius of curvature. The ratio of the vehicle speed to the radius of curvature gives the yaw rate. Of course, such wheel angle data 38 is dependent on the type of vehicle to which the present invention is applied. For example, the wheel angle data 38 for a railcar may be truck-angle data. Using the front and rear truck angles, the curvature of the track can be determined at each point of travel of the railcar. Since the motion of the railcar is constrained to the track, the resulting yaw rate is the product of the curvature and speed.

Discrete data 36 shown as one of the input data 20 may be a data signal from a transponder or rail-detector where the mobile object is a railcar. Such discrete data 36 is provided to the Kalman filter 16 as a known location data signal with any error estimates and expected transmission delay, as well as offset times determined from the characteristics and location of the particular sensor providing the discrete data 36.

In an embodiment where the mobile object is provided with wheels, the AINS 10 of the present embodiment can calculate smoothly varying distance traveled along the path to use as odometer data. In comparison to raw odometer data, the accuracy of this calculation is improved because the Kalman filter 16 is preferably provided with error elements in the state vector for speed-sensor bias and scale factor error. As a result, GPS and other position observations calibrate the speed sensor over time to enhance its accuracy. Smoothness is achieved by limiting the feedback of Kalman filter 16 corrections. This is in contrast to corrections in position, or distance to the next map point, which may change rapidly if there is a sudden increase in the quality of input data, such as reacquisition of GPS data 30.

In the above regard, the AINS 10 of the present embodiment further calculates the distance to the next map point. This information may be desirable for various applications such as in modern railcars. For example, such information would be necessary for positive train control in which various functions and operations of the train may be automated. Such calculated distance is based on the best estimate of position, in which case there may be sudden changes if the quality of the input data 20 improves suddenly, again for example, if GPS data 30 is reacquired. In contrast, the calculated distance along the path is always smoothly changing.

Figure 6:
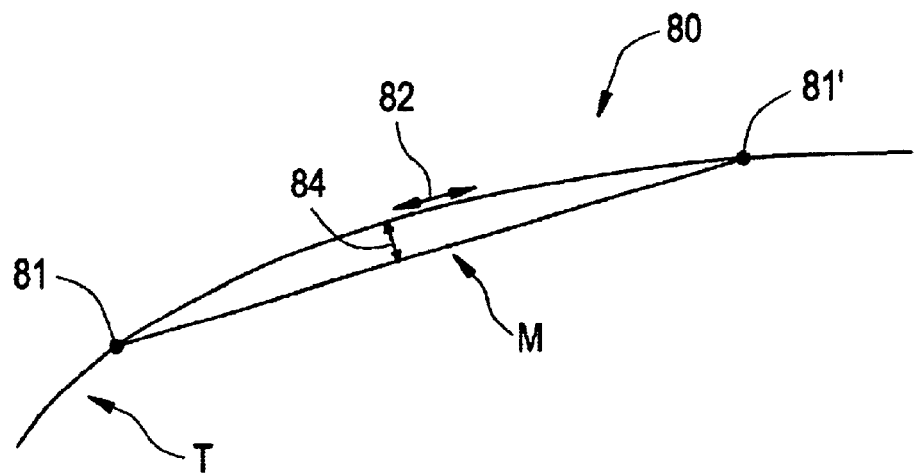
FIG. 6 illustrates the use of along-track and across-track information to determine a location of a mobile object in accordance with another aspect of the present invention.

FIG. 6 is a schematic illustration 80 showing the use of along-track and across-track information to determine a location of the mobile object in accordance with another aspect of the present invention. In particular, line "T" represents the track or path and line segment 82 indicates the along-track direction. The location of the mobile object in the along-track direction can be determined by speed sensor data, even in the absence of other data. Map segment "M" is drawn from map information 34 between map points 81 and 81', and the location in across-track direction as shown by segment 84 is determined using the map information 34. Thus, speed sensor data 32 may be used to enhance the calculation of location in the along-track direction, and map information 34 may be used to improve the accuracy of the calculated location in the across-track direction. Because these two directions are perpendicular to each other, the two types of data together improve accuracy in inertial navigation of a mobile object in all directions on the surface of the earth.

Thus, the AINS 10 in accordance with the illustrated embodiment may be used to calculate and report orientation, standstill condition, and direction of motion with respect to the path etc., in any appropriate manner. Changes in these parameters as well as others may be determined from wheel tachometer data when available, or from the Kalman filter 16 and the variety of auxiliary input data 20 if such wheel tachometer data is otherwise unavailable. In view of the discussion above, it should now be apparent to one of ordinary skill in the art that the AINS in accordance with the present invention enhances inertial navigation and filter aiding so that accurate navigation can be attained for various types of inertial sensors without requiring use of high precision sensor by enhancing the navigation with auxiliary input data. Of course, this allows AINS of the present invention to be implemented very economically.

It should also be evident that AINS of the present invention may be especially advantageously used for mobile objects that are subject to constraints, such as motion along a known path such as a road or a track. Hence, AINS of the present invention may be especially advantageously applied for railcars, trolleys and the like which are constrained to move along a track. However, such constraints are also encountered in automotive applications along interstates and highways where the automobile may be constrained to a particular path. As previously noted, the AINS of the present invention may be applied to other applications as well. For example, in applications where the mobile object is a mobile probe used for navigating through a pipe, the movement of the mobile probe would be confined within the pipe.

Figure 7:
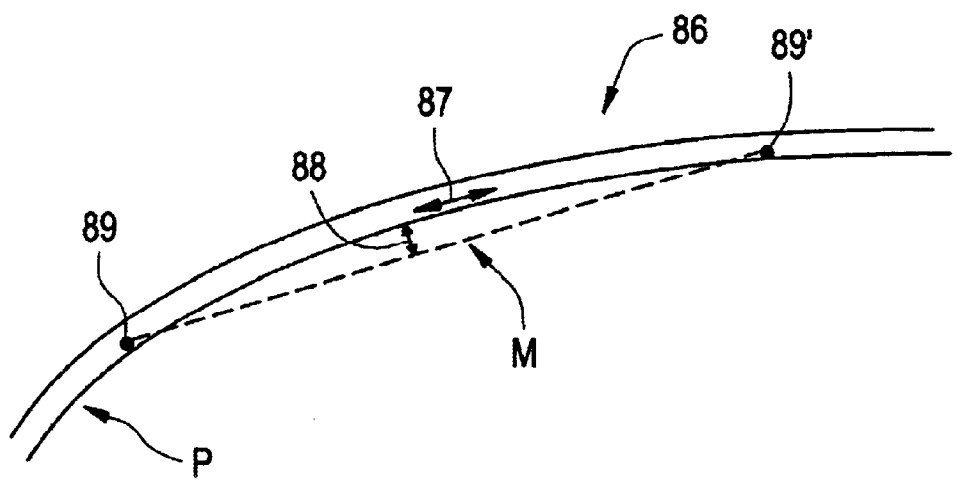
FIG. 7 illustrates the use of along-pipe and across-pipe information to determine a location of a mobile object in accordance with another aspect of the present invention.

In the above regard, FIG. 7 is a schematic illustration 86 showing the use of the AINS 10 in accordance with the present invention for navigating in a pipe. In particular, line "P" represents the pipe and line segment 87 indicates the along-pipe direction in the pipe P. The location of the mobile object in the along-pipe direction can be determined b speed sensor data, even in the absence of other data. Map segment "M" is drawn from map information 34 between map points 89 and 89', and the location in across-pipe direction as shown by segment 88 is determined using the map information 34. Thus, the AINS 10 of the present invention may be used to accurately determine the location of a mobile object within pipe P. Of course, as previously noted, the AINS of the present invention may also be applied to mobile objects that are not constrained as well.

It is again noted that whereas the illustrated embodiment of the AINS 10 incorporated all the methods and features described above, the present invention is not limited thereto. The features and data as described above may be used individually or in combination to improve the performance of any AINS. The methods and features may be used, as needed, to provide improved capability even when GPS or other position data is not available.

It should be evident from the discussion above that the present invention also provides a method for navigating a mobile object. In this regard, FIG. 8 is a flow diagram 90 showing an exemplary method for navigating a mobile object in accordance with another aspect of the present invention. The method includes step 91 in which mobility of the mobile object is constrained to a path, and step 92 in which map information associated with the path and other auxiliary data is provided. In step 92, acceleration and/or angular velocity of the mobile object is monitored, and corresponding acceleration data and/or angular velocity data is provided. The method also includes step 94 in which a plurality of output data for navigating the mobile object is determined based on the acceleration data and/or angular velocity data, the output data with position output indicative of the position of the mobile object.

The accuracy of the position output is enhanced in step 95 by estimating the position of the mobile object based on constraints to mobility of the mobile object and the auxiliary input data such as map information associated with the path. As explained above relative to FIG. 1, the enhancement of the position output may be based on state and dynamics information of the mobile object which may be derived from the acceleration data and/or angular velocity data. For example, the step of estimating the position of the mobile object may be based on positional input data, speed data, wheel angle data, and discrete data.

In the method shown in the flow diagram 90 of FIG. 8, the accuracy of the position output is optionally determined in step 96 and a corresponding output may be provided as output data. As explained above, the accuracy output may be expressed as a confidence interval for distance along the path, or confidence circle, or a confidence ellipse. In this regard, the map information preferably includes coordinates of a series of map points marking at least one path segment, and along-path distances between the series of points.

In addition, the method may optionally further include the step of determining velocity and attitude of the mobile object, and providing outputs corresponding thereto which may be used to determine position, an along-path distance, and/or an along-path confidence interval. Furthermore, by using the map information, additional steps may be provided to determine where the position of the mobile object coincides with a known map point to further enhance accuracy of the position output. Moreover, the along path distance may be monitored so as to allow comparison of the along path distance with the length of the path segment to determine the accuracy of the map information.

While various embodiments and aspects of the present invention have been shown and described, it is understood that the invention is not limited thereto. The present invention may be changed, modified and further applied by those skilled in the art. Therefore, this invention is not limited to the detail shown and described previously, but also includes all such changes and modifications.

We claim:

1. An aided inertial navigation system (AINS) for navigating a mobile object, said AINS comprising:
   an inertial measurement unit that provides acceleration data and angular velocity data of said mobile object, said mobile object having constraints which constrain mobility of said mobile object to a path;
   a processor that receives said acceleration data and angular velocity data from said inertial measurement unit, and provides output data with a position output indicative of position of said mobile object; and
   an error correction device that receives as input, state and dynamics information of said mobile object, and provides as output, state corrections to said processor;
   wherein said error correction device is provided with zero-azimuth-change observations when said mobile object is stationary to freeze the azimuth when said mobile object is stationary and to suppress azimuth drift, and said processor enhances said position output based on said state corrections and said constraints to said mobile object to increase accuracy of said position output.

2. The AINS of claim 1, wherein said error correction device further receives auxiliary input data including at least one of positional input data, map information associated with said path, speed data, wheel-angle data, and discrete data.

3. The AINS of claim 2, wherein said state corrections provided to said processor are based on said auxiliary input data as well as said state and dynamics information.

4. The AINS of claim 1, wherein said inertial measurement unit includes at least one of an accelerometer that provides said acceleration data, and a gyroscope that provides said angular velocity data.

5. The AINS of claim 4, wherein said inertial measurement unit includes at least one accelerometer and at least one gyroscope.

6. The AINS of claim 1, wherein said processor is an inertial navigation and sensor compensation unit and said output data further includes a velocity output indicative of speed of said mobile object, and an attitude output indicative of orientation of said mobile object.

7. The AINS of claim 1, wherein said processor is an inertial navigation and sensor compensation unit, and said output data further includes an accuracy output indicative of accuracy of said position output.

8. An aided inertial navigation system (AINS) for navigating a mobile object, said AINS comprising:
   an inertial measurement unit adapted to provide acceleration data and angular velocity data of said mobile object, said mobile object having constraints which constrain mobility of said mobile object to a path;
   a processor adapted to receive said acceleration data and angular velocity data from said inertial measurement unit, and to provide output data with a position output indicative of position of said mobile object, said processor being an inertial navigation and sensor compensation unit, and said output data further including an accuracy output indicative of accuracy of said position output; and
   an error correction device adapted to receive as input, state and dynamics information of said mobile object, and provide as output, state corrections to said processor;

wherein said processor enhances said position output based on said state corrections and said constraints to said mobile object to increase accuracy of said position output, and said accuracy output is expressed as a confidence interval for distance along said path.

9. The AINS of claim 1, wherein said error correction device is a Kalman filter.

10. The AINS of claim 9, wherein said Kalman filter further receives auxiliary input data including at least one of positional input data, map information associated with said path, speed data, wheel-angle data, and discrete data.

11. The AINS of claim 10, wherein said positional input data is provided by at least one of Global Positioning System, Differential GPS, ultrasonic positioning system, and radio-frequency positioning system.

12. The AINS of claim 10, wherein said speed data is provided by at least one of an odometer, wheel tachometer, and Doppler radar.

13. The AINS of claim 10, wherein said wheel angle data is provided by at least one of wheel angle sensor and truck angle sensor.

14. The AINS of claim 10, wherein said discrete data is provided by at least one of a transponder and a rail detector.

15. The AINS of claim 2, wherein said map information includes coordinates of a series of map points marking at least one map segment.

16. The AINS of claim 15, wherein said processor further calculate a maximum distance error between a segment of said path and said at least one map segment.

17. The AINS of claim 15, wherein said map information further includes along-path distances between said series of map points.

18. The AINS of claim 1, wherein said mobile object is an automobile, and said path is defined by a road.

19. The AINS of claim 1, wherein said vehicle is at least one of a railcar and a trolley, and said path is defined by a track.

20. The AINS of claim 1, wherein said mobile object is a m obile probe, and said path is defined by a pipe.

21. An aided inertial navigation system (AINS) for navigating a mobile object, said AINS comprising:
   an inertial measurement unit that provides acceleration data and angular velocity data of said mobile object, said mobile object having constraints which constrain mobility of said mobile object to a path;
   a processor that receives said acceleration data and angular velocity data from said inertial measurement unit, constrains a lateral velocity of said mobile object to zero, and provides a plurality of output data for navigating said mobile object, said plurality of output data including a position output indicative of position of said mobile object; and
   an error correction device that:
      receives as input, state and dynamics information of said mobile object and auxiliary input data including at least one of positional input data, map information associated with said path, speed data, wheel angle data and discrete data; and
      provides as output, state corrections to said processor, said state corrections being determined based on said auxiliary input data;
   wherein said processor enhances accuracy of said position output indicative of position of said mobile object based on said state corrections and said constrained lateral velocity.

22. An aided inertial navigation system (AINS) for navigating a mobile object, said AINS comprising:

an inertial measurement unit that provides acceleration data and angular velocity data of said mobile object;
a processor that receives said acceleration data and angular velocity data from said inertial measurement unit, constrains a lateral velocity of said mobile object to zero, and provides output data having position output indicative of position of said mobile object; and
a Kalman filter that receives as input, state and dynamics information of said mobile object, and provides as output, state corrections to said processor, said Kalman filter being provided with zero-azimuth-change observations when said mobile object is stationary to freeze the azimuth when said mobile object is stationary and to suppress azimuth drift;
wherein said processor enhances said position output based on said state corrections and said constrained lateral velocity to increase accuracy of said position output.

23. A method for navigating a mobile object comprising the steps of:
   constraining mobility of said mobile object to a path;
   monitoring acceleration and angular velocity of said mobile object;
   providing acceleration data and angular velocity data;
   determining output data having at least position output indicative of position of said mobile object based on said acceleration data and angular velocity data;
   providing zero-azimuth-change observations when said mobile object is stationary to freeze the azimuth when said mobile object is stationary and to suppress azimuth drift; and
   enhancing accuracy of said position output indicative of position of said mobile object based on said constraints to mobility of said mobile object.

24. The method of claim 23, further including the step of providing map information associated with said path, wherein said step of enhancing accuracy of said position output is further based on said map information.

25. The method of claim 23, wherein said step of enhancing accuracy of said position output is further based on state and dynamics information of said mobile object, said state and dynamics information being derived from said acceleration data and angular velocity data.

26. The method of claim 23, further including the steps of determining velocity and attitude of said mobile object, and providing a velocity output indicative of speed of said mobile object and an attitude output indicative of orientation of said mobile object.

27. The method of claim 23, further including the step of determining accuracy of said position output, and wherein said output data further includes an accuracy output indicative of accuracy of said position output.

28. The method of claim 23, wherein said step of enhancing accuracy of said position output includes the step of generating state corrections using a Kalman filter based on at least one of positional input data, speed data, map information, wheel angle data, and discrete data.

29. The method of claim 28, further including the step of determining smoothly varying distance along path for use as said speed data.

30. The method of claim 28, wherein said map information includes coordinates of a series of map points marking at least one map segment, and along-path distances between said series of points.

31. The method of claim 30, further including the steps of determining where position of said mobile object coincides with a known map point and further enhancing accuracy of said position output based on said known map point.

32. A method for navigating a mobile object comprising the steps of:

constraining mobility of said mobile object to a path;

monitoring acceleration and angular velocity of said mobile object providing acceleration data and angular velocity data determining output data having at least a position output indicative of position of said mobile object based on said acceleration data and angular velocity data;

enhancing accuracy of said position output indicative of position of said mobile object based on said constraints to mobility of said mobile object, said step of enhancing accuracy of said position output including the step of generating state corrections using a Kalman filter based on at least one of positional input data, speed data, map information, wheel angle data, and discrete data, wherein said map information includes coordinates of a series of map points marking at least one map segment, and along-path distances between said series of points; and monitoring along path distance and comparing said along path distance to length of said at least one map segment to determine accuracy of said map information.

33. A method for navigating a mobile object comprising the steps of:

constraining mobility of said mobile object to a path;

monitoring acceleration and angular velocity of said mobile object;

providing acceleration data and angular velocity data;

determining output data having at least a position output indicative of position of said mobile object based on said acceleration data and angular velocity data;

enhancing accuracy of said position output indicative of position of said mobile object based on said constraints to mobility of said mobile object, said step of enhancing accuracy of said position output including the step of generating state corrections using a Kalman filter based on at least one of positional input data, speed data, map information, wheel angle data, and discrete data, wherein said map information includes coordinates of a series of map points marking at least one map segment, and along-path distances between said series of points; and calculating a maximum distance error between a segment of said path and said at least one map segment.

34. A method for navigating a mobile object comprising the steps of:

constraining mobility of said mobile object to a path;

providing map information associated with said path;

monitoring acceleration and angular velocity of said mobile object;

providing acceleration data and angular velocity data;

constraining lateral velocity mobile object to zero;

determining output data with position output indicative of position of said mobile object based on said acceleration data and angular velocity data for navigating said mobile object; and enhancing accuracy of said position output based on said constraints lateral velocity and said map information associated with said path.

35. A method for navigating a mobile object comprising the steps of:

monitoring acceleration and angular velocity of said mobile object and providing acceleration data and angular velocity data;

constraining lateral velocity of said mobile object to zero;

determining output data with a position output indicative of position of said mobile object for navigating said mobile object based on said acceleration data and angular velocity data;

providing a Kalman filter that receives as input, state and dynamics information of said mobile object, and provides state corrections as outputs;

providing said Kalman filter with zero-azimuth-change observations when said mobile object is stationary to freeze the azimuth when said mobile object is stationary and to suppress azimuth drift; and enhancing accuracy of said position output indicative of position of said mobile object based on said state corrections and said constrained lateral velocity.

36. The method of claim 35, further including the step of determining whether said mobile object is stationary.

37. The method of claim 36, further including the steps of establishing an azimuth reference value by sampling and saving a current azimuth value.

38. The method of claim 37, further including the step of establishing an azimuth reference error in said Kalman filter error state which is same as said azimuth reference value.

39. A method for navigating a mobile object comprising the steps of:

monitoring acceleration and angular velocity of said mobile object and providing acceleration data and annular velocity data;

determining output data with a position output indicative of position of said mobile object for navigating said mobile object based on said acceleration data and angular velocity data;

providing a Kalman filter adapted to receive as input, state and dynamics information of said mobile object, and providing state corrections as outputs;

providing said Kalman filter with zero-azimuth-change observations when said mobile object is stationary to enhance accuracy of said position output indicative of position of said mobile object;

determining whether said mobile object is stationary;

establishing an azimuth reference value by sampling and saving a current azimuth value;

establishing an azimuth reference error in said Kalman filter error state which is same as said azimuth reference value; and further including the step of adjusting an error state covariance matrix to accurately reflect said azimuth reference error.

* * * * *